United States Patent
Harmer

[11] Patent Number: 5,388,979
[45] Date of Patent: Feb. 14, 1995

[54] MOLD AND PRESS ASSEMBLY FOR PRESS MOLDING ARTICLES

[75] Inventor: Brian Harmer, Benoni, South Africa

[73] Assignee: Agrifibre Developments Limited, Guernsey, Channel Islands

[21] Appl. No.: 6,949

[22] Filed: Jan. 21, 1993

Related U.S. Application Data

[63] Continuation-in-part of Ser. No. 701,518, May 16, 1991, abandoned, which is a continuation of Ser. No. 578,799, Sep. 7, 1990, abandoned.

[30] Foreign Application Priority Data

Sep. 8, 1989 [ZA] South Africa .................. 89/6868

[51] Int. Cl.6 ............................................. B29C 33/20
[52] U.S. Cl. ...................... 425/408; 425/450.1; 425/451.5; 425/451.7; 425/451.9; 425/453
[58] Field of Search ............... 425/450.1, 451.5, 451.9, 425/451.6, 451.7, 453, DIG. 221, DIG. 48, 408, 253, 452, 413, 317, 408

[56] References Cited

U.S. PATENT DOCUMENTS

| | | | |
|---|---|---|---|
| 2,783,500 | 3/1957 | Lazarr | 425/DIG. 45 |
| 2,984,176 | 5/1961 | Sommer et al. | 425/451.9 |
| 3,676,033 | 7/1992 | Buonaiuto | 425/413 |
| 3,764,243 | 10/1973 | Gambill et al. | 425/453 |
| 3,868,204 | 2/1975 | Bongers | 425/451.5 |
| 4,174,939 | 11/1979 | Fenner | 425/451.9 |
| 4,318,682 | 3/1982 | Larson et al. | 425/451.9 |
| 4,403,810 | 9/1983 | Bieneck | 425/DIG. 221 |
| 5,104,308 | 4/1992 | Morton et al. | 425/451.9 |

Primary Examiner—Jay H. Woo
Assistant Examiner—Duane S. Smith

[57] ABSTRACT

A mold assembly, wherein the mold assembly has a peripheral surrounding body into which two opposed die-halves fit to define a mold cavity. The die-halves are each releasably lockable to the surrounding body by means of catches so that the mold can be locked, releasably, in a closed condition after having been closed in a press to compress material therein.

9 Claims, 11 Drawing Sheets

MOLD AND PRESS ASSEMBLY FOR PRESS MOLDING ARTICLES

This application is a continuation-in-part application of application Ser. No. 07/701,518 filed May 16, 1991 (now abandoned) which in turn was a continuation application of application Ser. No. 07/578,799 filed Sep. 7, 1990 (now abandoned).

FIELD OF THE INVENTION

This invention relates to a mold and press assembly for press molding articles and, more particularly, but not exclusively, for press molding articles made of compacted sub-divided materials which require to be compacted in a press, heated to cure or set same, and subsequently removed from the mold.

BACKGROUND TO THE INVENTION

In the manufacture of articles by press molding certain starting materials, it is often necessary that the starting material be compressed in a mold by means of a press, and that the compacted material be maintained in the mold while heat or other means is used to cure or set the material in the molded condition. In many cases, the mold and material is cooled prior to removal of the molded article from the mold.

Molding articles in such a manner is time consuming as appreciable lengths of time are often required to effect the curing or setting, and cooling where necessary, prior to removal of the molded article from the mold. To maintain the mold in the press for the full duration of the cycle leads to uneconomical employment of a press which is generally a costly item of capital equipment.

One solution to this problem which has been proposed is to provide separate mold assemblies which are closed in a press and then are held in the closed position while being removed from the press and being further treated for curing by heating and subsequent cooling etc. An endless series of molds can then be treated by a single press.

Starting materials of particular concern are those comprising a base or filler material mixed with a variety of bonding agents, natural and plastic materials which are to be cured, set or bonded under the action of heat and optionally pressure. In many cases, this is followed by cooling, at least where the bonding agent, natural or plastic material is of the thermo-plastic type. It is to be noted that the natural adhesive nature of the ligning and cellulose content of the vegetable fibers or the like can be employed to advantage. Thus peat or the like can be added if required.

Filler materials of particular interest are those which are fairly compressible such as sub-divided timber, grasses, straws, other vegetable matter, and the like, but the method and apparatus with which this invention is concerned is also applicable to less compressible filler materials, for example, sub-divided solid materials such as ores, rocks, minerals, earths and the like or even to other moldable materials.

It is the object of this invention to provide a method and apparatus for press molding articles of the general type envisaged above which will provide a satisfactory rate of production while employing a limited number of molding presses, in particular one or two.

SUMMARY OF THE INVENTION

In accordance with this invention there is provided a mold assembly comprising a surrounding mold body into which two die halves fit to define a mold cavity between them, and catch assemblies associated with the mold body for releasably locking each of the two die halves within the body in its cavity defining position relative to the body.

Further features of the invention provide for the surrounding mold body to have an inner surface which defines a peripheral edge to the mold cavity formed between the two die halves; for said surface to be provided with formations for temporarily engaging the periphery of an article molded within the mold cavity so that the die halves can be removed while the molded article remains captive relative to the surrounding mold body and wherein the formations permit the mold article to be separated from the surrounding mold body by exerting force on the molded article in an appropriate direction; and for the catches to be spring-loaded to the engaged position.

The invention also provides a press assembly particularly adapted for using a mold assembly as defined above.

The mold assembly defined above permits of a unique method of molding articles using same wherein release of a molded article from the mold assembly is carried out by firstly removing one die half from the assembly, separating the surrounding mold body from the other die half and thereafter, according to the nature of the mold assembly, either removing the molded article from the surrounding mold body where said formations on said surface are present or removing the molded article from the said other die half where such formations are not present.

In the preferred arrangement the said inner surface of the peripheral mold body is provided with said formations so that the molded article is held captive within the surrounding mold body while both die halves are removed and the molded article can thereafter be pushed out of the surrounding mold body at a suitable discharge station.

It will be clear that a special press assembly can be fabricated to take advantage of the mold assembly provided by this invention.

In order that the invention may be more fully understood a press assembly and two variations of mold assembly will now be described with reference to the accompanying drawings.

DETAILED DESCRIPTION WITH REFERENCE TO THE DRAWINGS

Figure 1A:
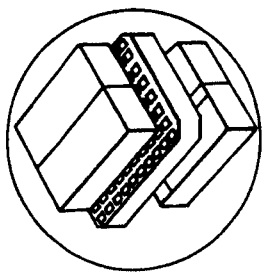
FIG. 1 is a perspective view, partly broken away, of a complete press molding assembly.
Figure 1B:
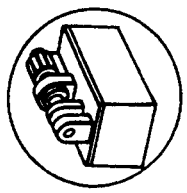

In this application of the invention the press assembly comprises, basically, a feed hopper 1, arranged to feed starting material into a feeding mechanism generally indicated by numeral 2. The feeding mechanism is located immediately behind a vertically orientated main production press 3, located roughly centrally in one limb 4, of a square production path generally indicated by numeral 5. The production path includes a heating section 6, a cooling section 7 and a drying section 8 defining the other three limbs of the production path. Each of these sections can be made up of an integral number of modular units so that different sized assemblies can be constructed using the same basic modular components.

Figure 3:
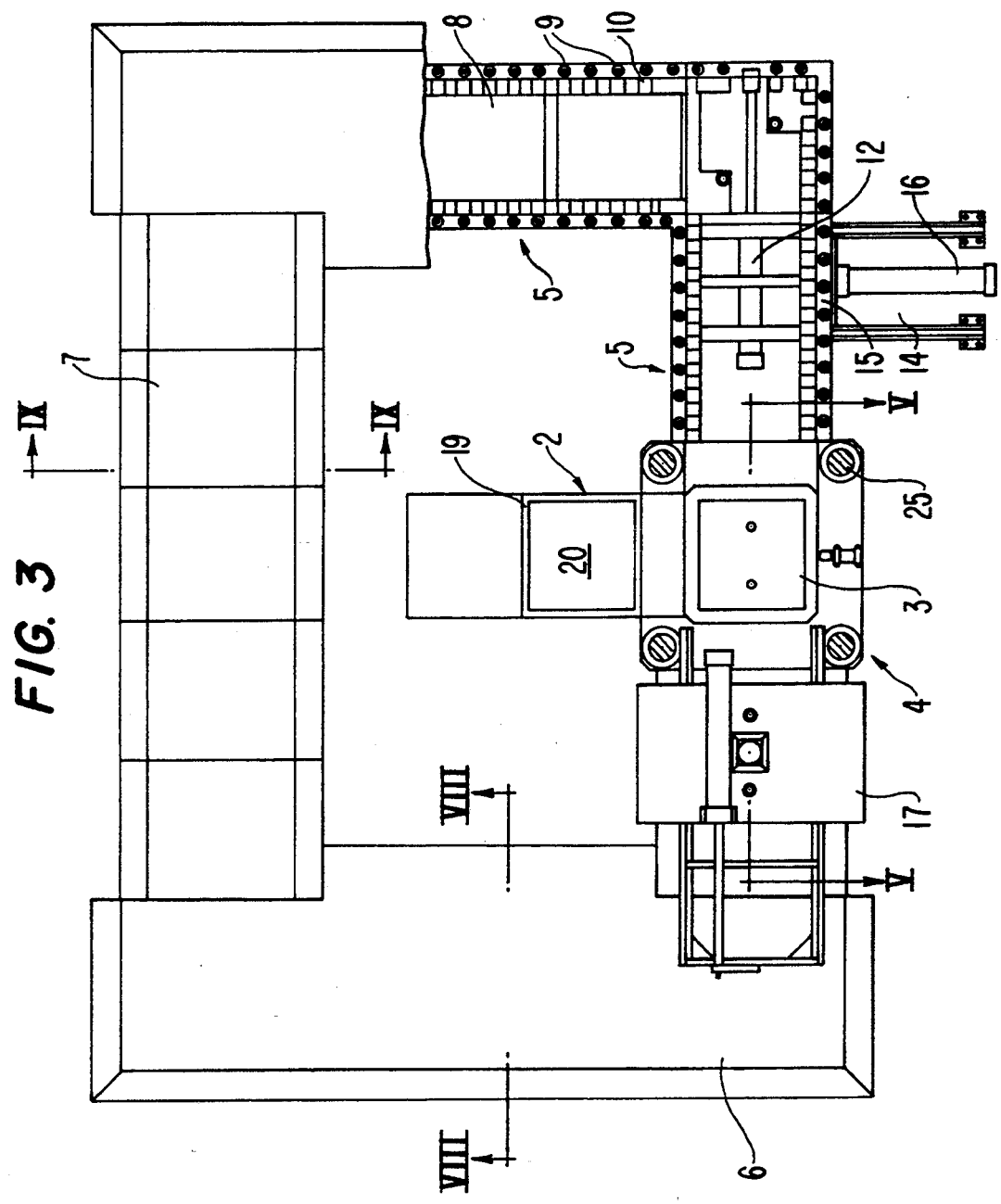
FIG. 3 is a schematic plan view illustrating the production path.
Figure 7A:
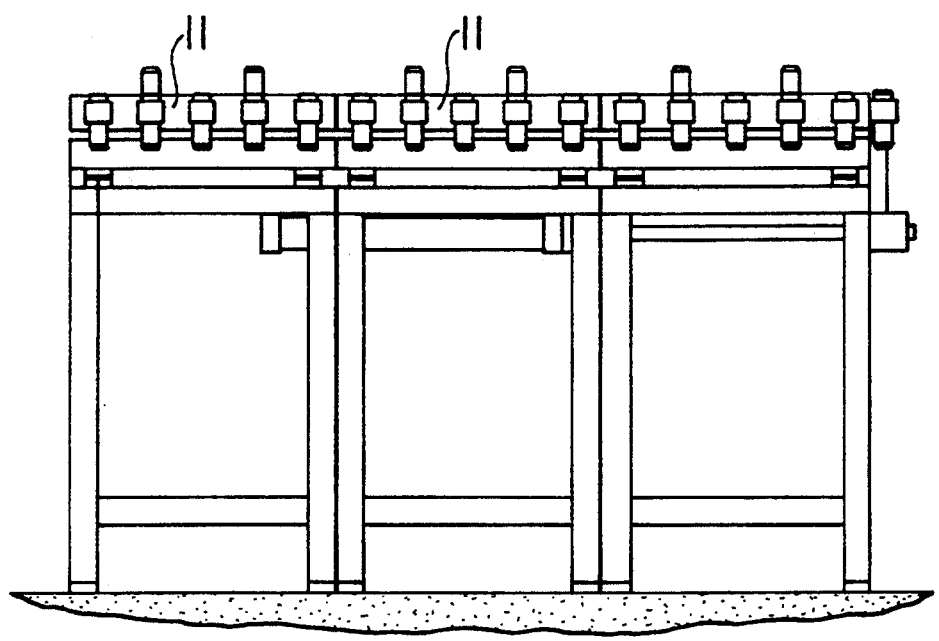
FIGS. 7a & 7b are a side elevation and end elevation of a corner transfer station of the production path.
Figure 7B:
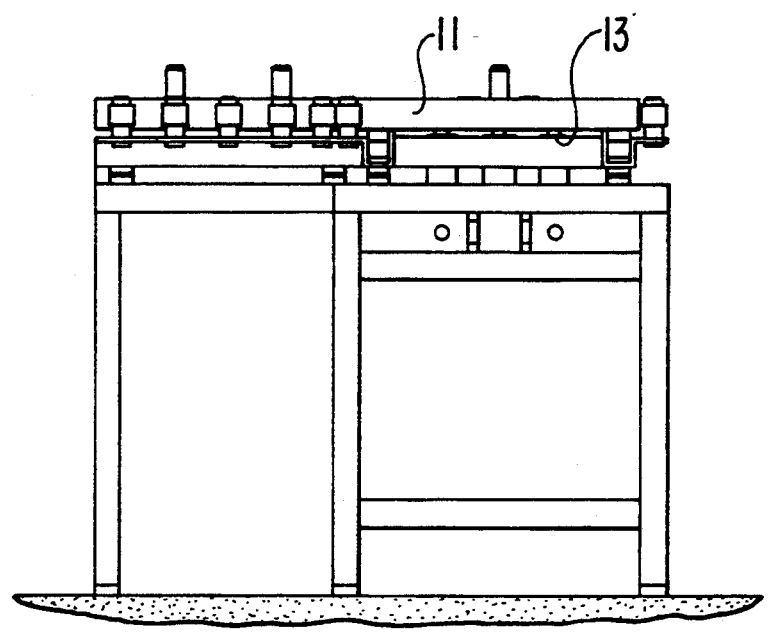

The production path is defined basically by a series of vertical and horizontal rollers 9 and 10 for guiding substantially square mold assemblies 11 around the square production path (see FIG. 3) and each corner of the production path has a conveyance cylinder 12 for moving a row of mold assemblies along the respective limb of the production path. At the corners, the horizontal support rollers are replaced by roller balls 13 (see FIG. 7b) to enable the molds 11 to move in each of the two necessary directions.

Also included in the press limb 4 of the production path is a mold loading/replacement station 14 where a section 15 of the support and guide roller assembly is transversely movable out of the limb by a loading piston 16. This loading/replacement station is located on the inward side of the press 3.

The production path also includes an elevated (located above the endless square path) discharge station 17 for molded articles, this discharge station feeding onto a transverse endless conveyor belt 18. Clearly the route around the production path for mold assemblies is from the press to the heating station, thence the cooling station, thence the drying station and back into the press limb to become discharged at the discharge station immediately prior to re-use of a mold in another cycle.

Reverting now to the feeding mechanism (shown most clearly in FIG. 4), this is composed basically of a transversely movable meter box 19 slidable back and forth on a table 20 at the lower end of the hopper 1. This meter box is arranged to feed a metered quantity of sub-divided starting material directly transversely onto a lower die half located in the press assembly 3. Preferably the shape of the feed box corresponds to the shape of the die half or mold so that the starting material is evenly distributed over the die half once in position thereon. A blanking plate 22 serves to close off the bottom of the hopper during the feeding cycle.

The press itself has a hydraulic piston and cylinder assembly 23 and the main press plate 24 has guide rods 25 associated therewith to ensure correct alignment of the two die halves during use. The press also has associated therewith a lifting cylinder 26 for raising a mold assembly as will be described hereinafter as well as a release cylinder 27 associated with the lower part of the press for releasing articles from a mold therein as will be described hereinafter.

Figure 8:
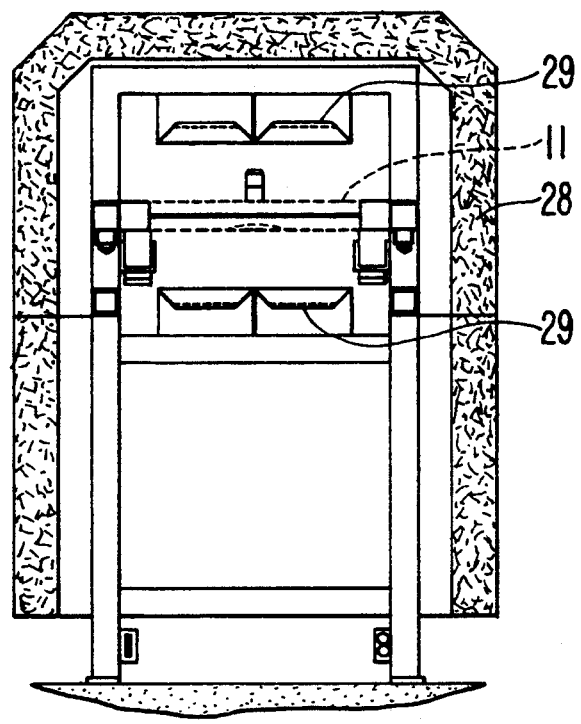
FIG. 8 is a cross-sectional elevation taken along line VIII—VIII in FIG. 3 of a heating (curing) station.

The heating section (see FIG. 8) is heat insulated by a suitable cooling 28 and has infrared electrical heating elements or gas burners 29 both above and below the path of movement of the molds therethrough.

Figure 9:
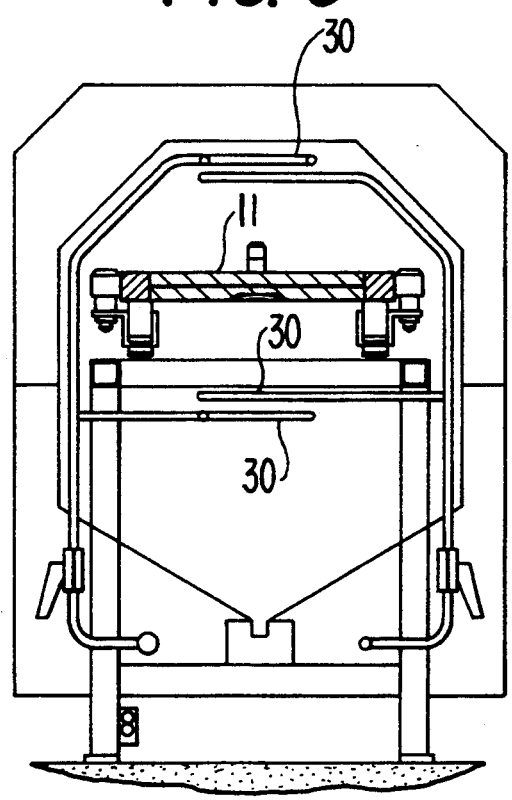
FIG. 9 is a similar sectional view taken along line IX—IX in FIG. 3 of a cooling station.
Figure 10:
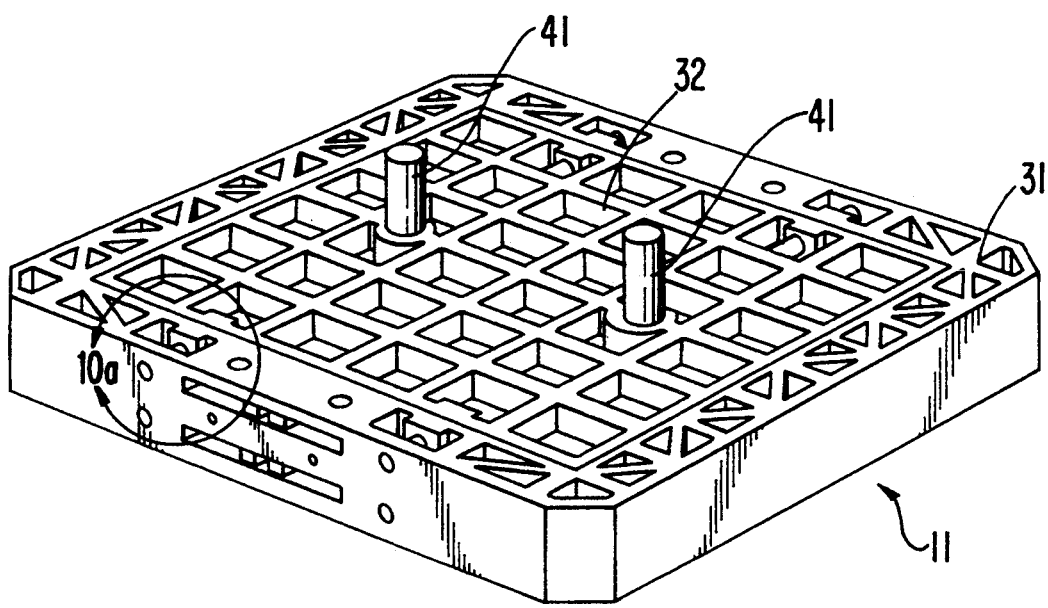
FIG. 10 is an isometric view with inset detail of a mold assembly according to the invention.
Figure 10A:
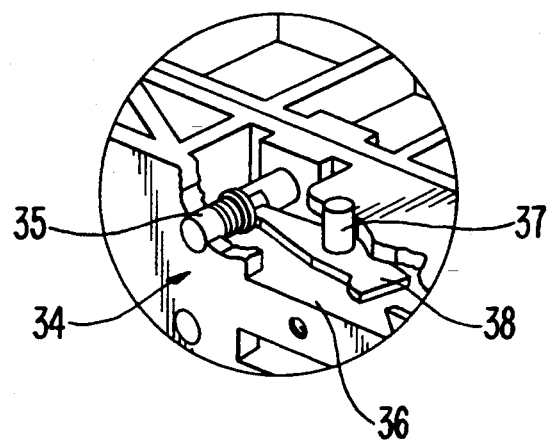

The cooling station 7 (see FIG. 9) on the other hand has a series of water/gas spray pipes 30 for spraying coolant fluid onto the molds to cool same during passage through this section.

The drying section 8 (not particularly illustrated) is similar but adapted to cause drying air to impinge on the molds to dry same.

A series of molds 11 is, according to this invention, provided so that the entire production path, apart from one corner space which is required to allow for movement of the molds along the various limbs of the production path, and the press area, can be filled with juxtaposed mold assemblies.

Each mold assembly comprises a surrounding mold body 31 into which fit an upper and lower die half 32 and 33 respectively. The body is, in this case, square in shape in order to enable it to be suitable for passage around the square production path as envisaged but with cut-off corners to avoid jamming.

Figure 11:
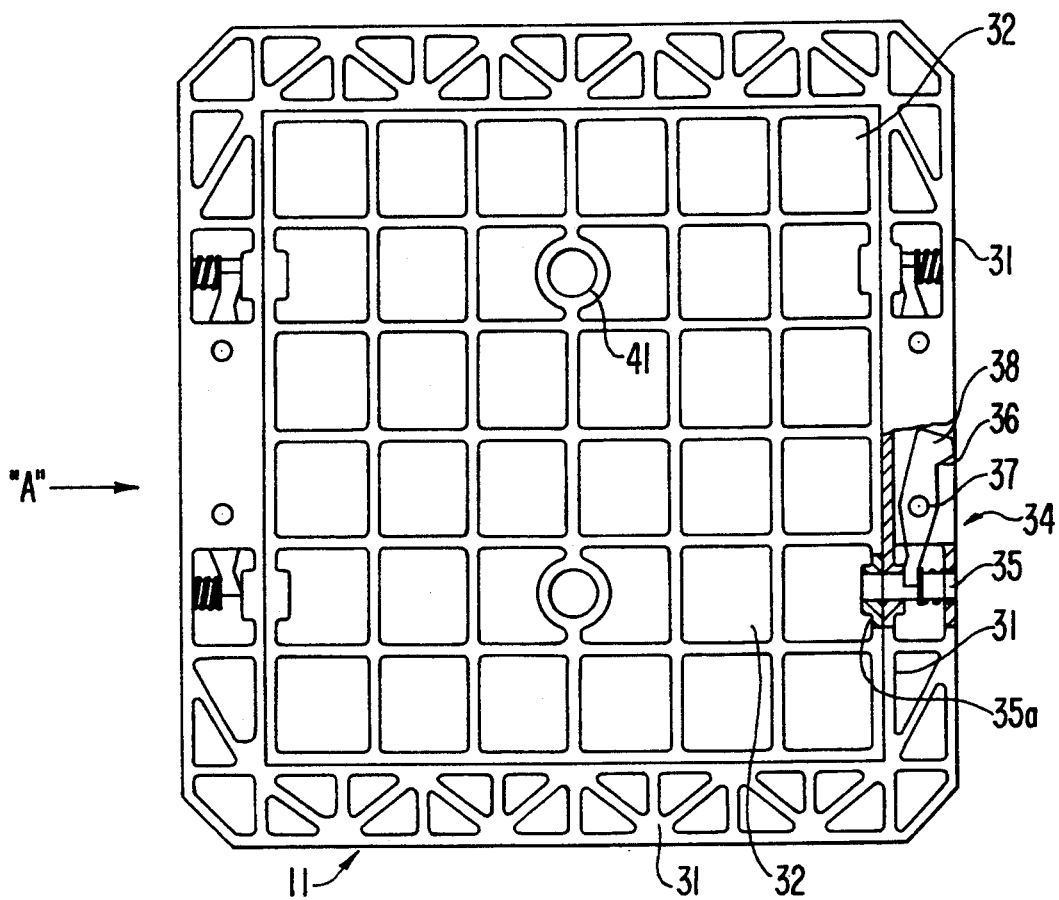
FIG. 11 is a plan view, partly sectioned, of the mold assembly.
Figure 12:
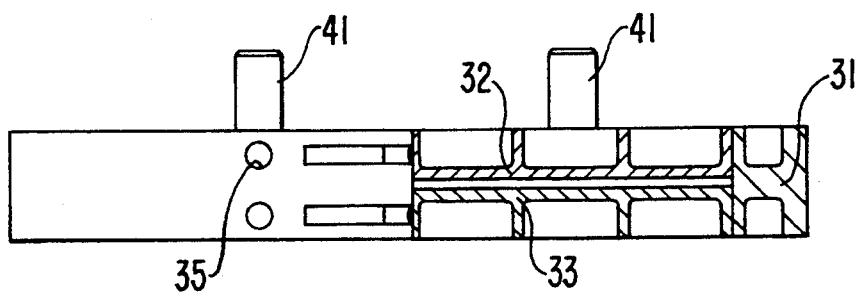
FIG. 12 is a partly sectioned side view of the mold assembly taken in the direction of arrow "A" in FIG. 11; and, FIG. 13 is an exploded view of a modified mold assembly according to the invention.

Each mold body is provided with catches (generally indicated by numeral 34 in FIG. 11) each catch comprising a laterally movable locking pin 35 spring biased to project inwardly from the inner periphery of the body and, in the operative position, to co-operate with aligned holes 35a provided in the respective die half 32 or 33. There are two spaced catch arrangements for each of two opposite sides of the upper and lower die halves.

The locking pin, in each case, has a rocker latch 36 associated therewith, the rocker latch being rotatable about a pivot 37 so that pressure on the free end 38 of the rocker latch can be used to rotate it about the pivot and to withdraw the associated pin 35 from co-operation with the upper or lower die half as the case may be. These free ends 38 of the rocker latches are each arranged for co-operation with hydraulically operable release cylinders as will be further described below. Clearly the two die halves are shaped internally to mold the required product which, in this case, is a substantially flat tile shaped product.

The above describes in fair detail the press assembly and mold according to the invention but other working parts of the apparatus will become quite apparent from the following description of its use and the method of this invention.

With the apparatus devoid of any mold assemblies, they are introduced one by one at the loading/replacement station 14 and the conveyance cylinders are operated to move them towards the press.

Figure 4:
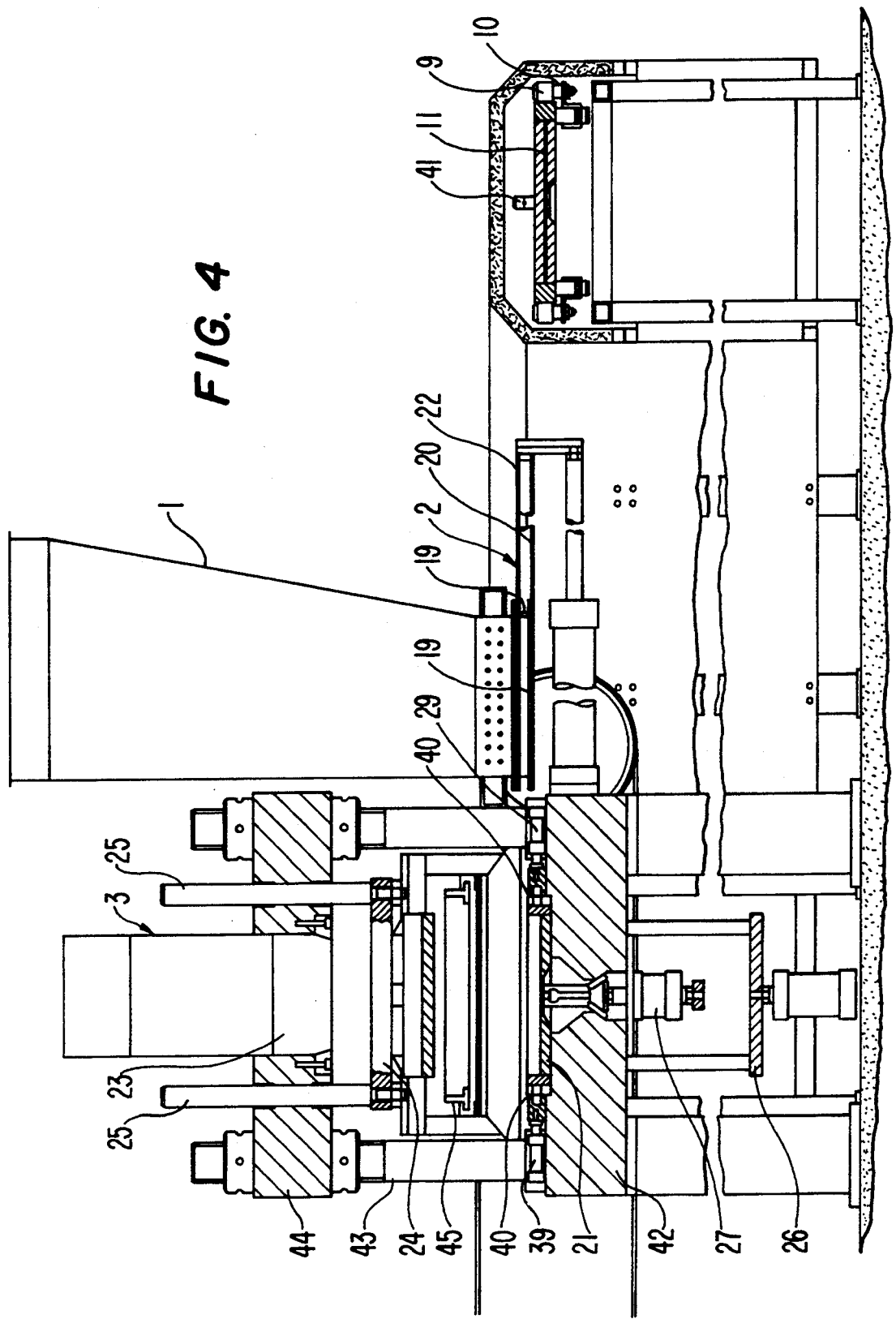
FIG. 4 is a cross-section through the production path taken through the press assembly and associated feeding mechanism.
Figure 5:
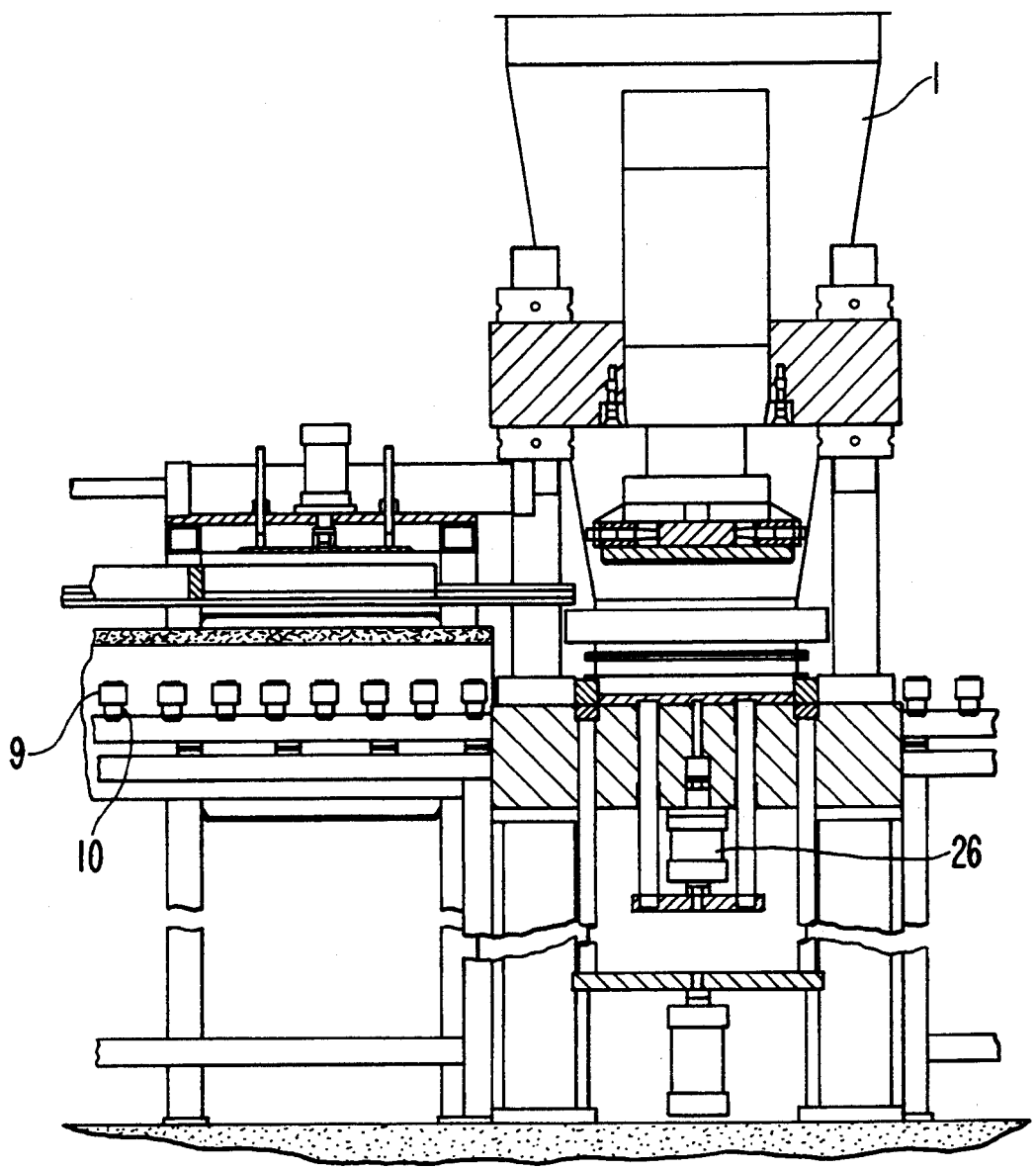
FIG. 5 is a sectional elevation taken along V—V in FIG. 3.
Figure 6A:
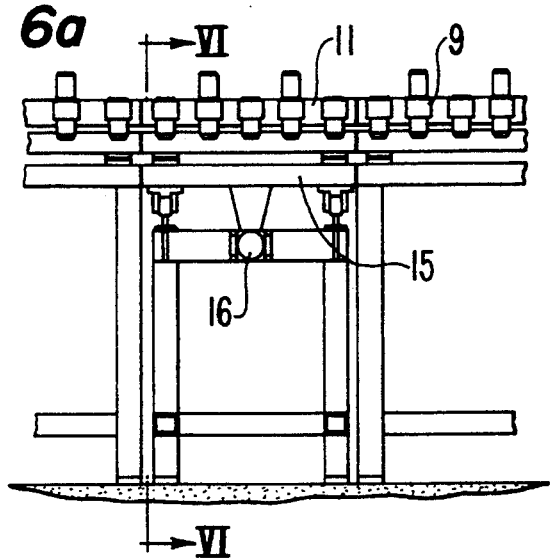
FIGS. 6a, 6b & 6c are a schematic elevation, plan view and side view ( taken along line VI—VI in FIG. 6a) of a mold loading/replacement station.
Figure 6B:
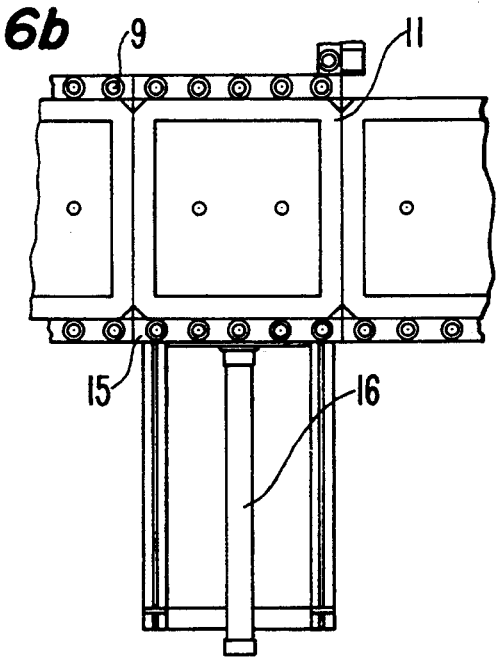
Figure 6C:
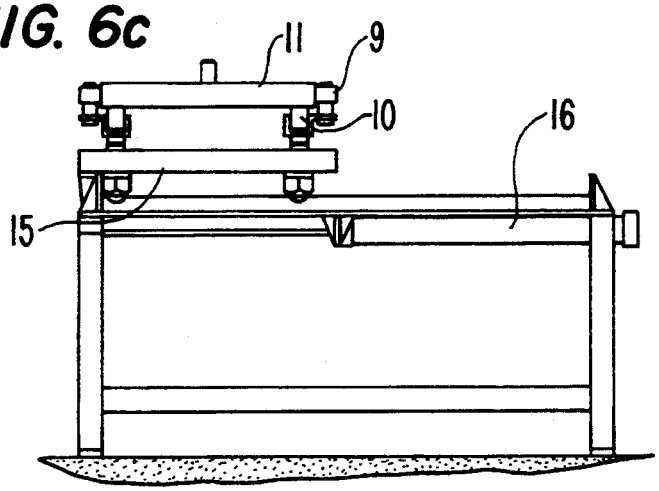

Once a mold assembly 11 reaches the press 3, release cylinders 39 located front and rear of the production path are operated to cause release fingers 40 to engage the free ends 38 of the rocker latches 36 of the mold assemblies which are orientated to be located at the front and rear of the production path (see FIG. 4).

This releases the locking pins 35 from the top and bottom die halves and the press is operated to lower and attach onto upstanding plunger pins 41 on the top die half.

The press is then operated to lift the top die half to open the mold leaving the mold body and bottom die half in position on the bed 42 of the press. This bed 42 is movable vertically by means of the lifting cylinder 26 to a position opposite the product discharge station 17 when the release cylinder 27 is operated to lift a lower die half relative to the mold body and with it, once the mold has completed an entire cycle, a molded product thereon. Movement of the bed 42 is guided by means of the vertical guides 43 associated with the press frame 44. Compressed air can be provided to assist, if required, in the removal of the molded product from the mold.

Figure 1:
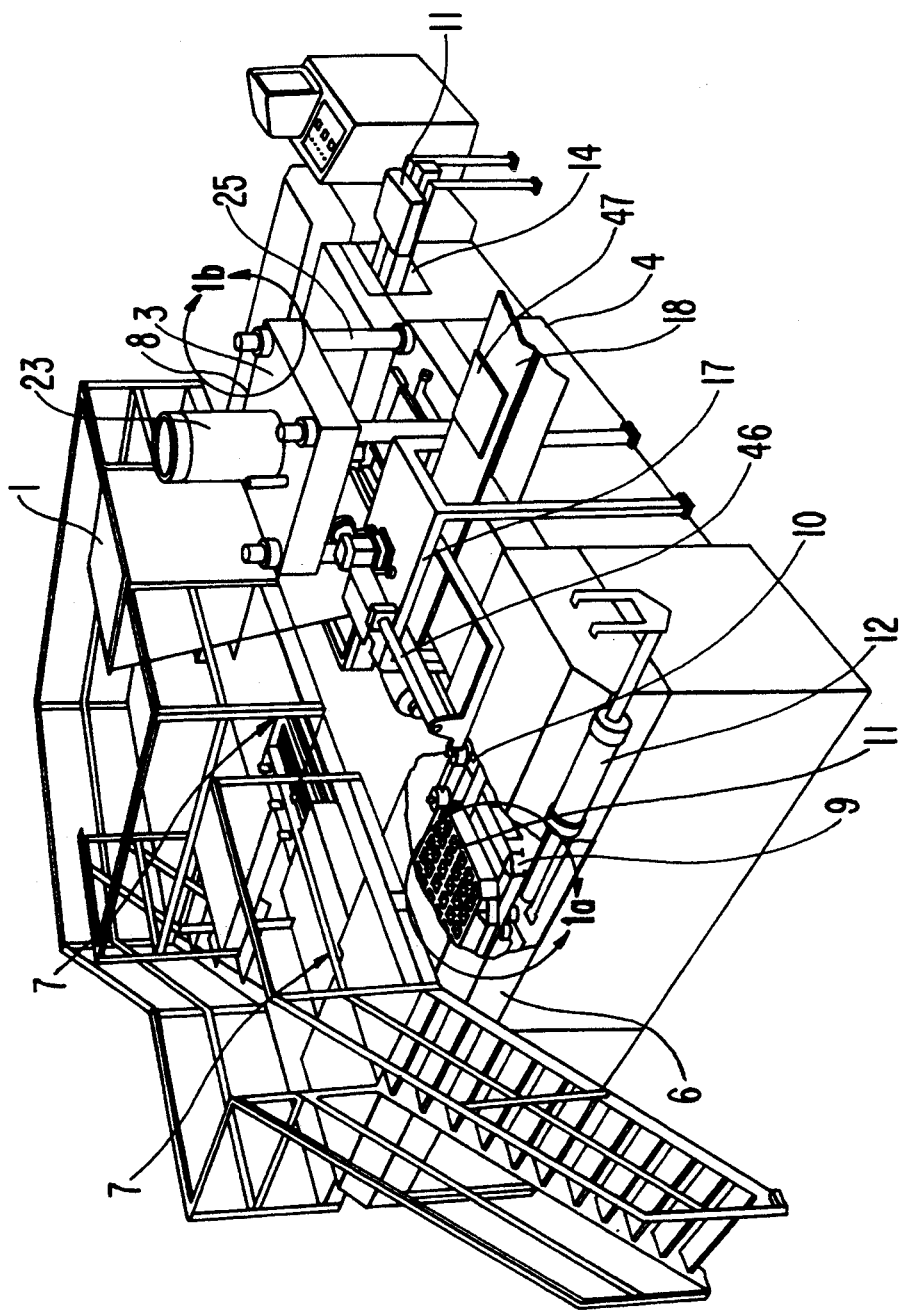
Figure 2:
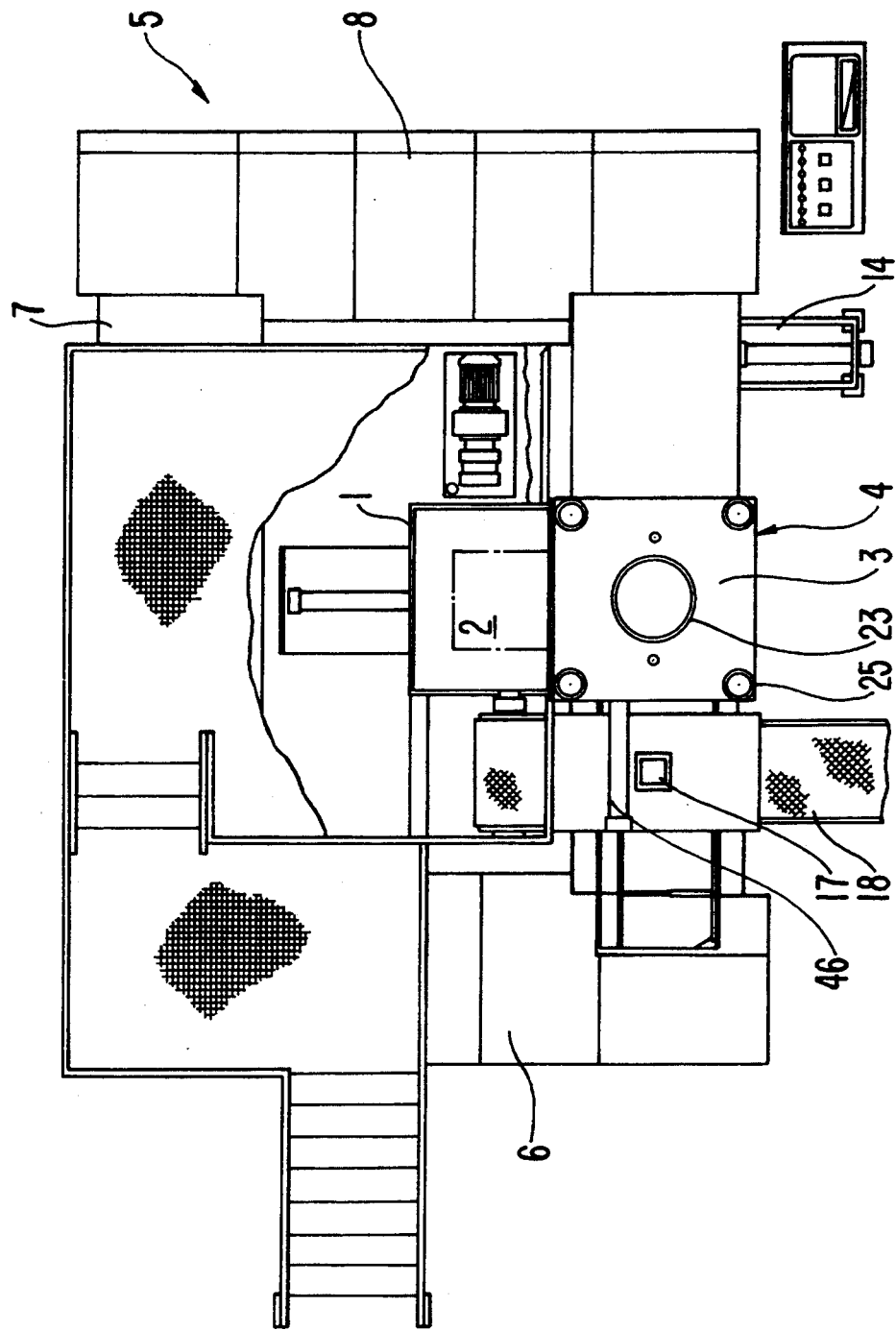
FIG. 2 is a plan view thereof.

Movement of the molded product is effected by a laterally movable surround 45, the movement of which is effected by its own piston and cylinder assembly 46. Such a molded product is illustrated in FIG. 1 on the belt 18 and is indicated by numeral 47.

The lower die half is then lowered by means of the release cylinder 27 into the mold body and the bed is lowered to its normal position.

At this stage the die halves are sprayed with a suitable release agent preparatory to loading thereof by means of a suitable spray device (not shown).

In this position the top of the mold body is located opposite the lowermost surface of the slidable meter box which then operates to transfer a mass of subdivided material mixed with a suitable resin material from the bottom of the hopper and over the mold where it falls into the now open mold. During this procedure the blanking plate 22 closes off the bottom of the hopper.

It is to be mentioned that in order to maintain material of the type under consideration, which is a finely chopped or ground straw, grass material or other vegetable matter freely flowable, low pressure gas is introduced at the bottom of the hopper and allowed to flow upwardly and out of the top. Also the hopper is vibrated gently to ensure that the material does not bridge or become stuck therein.

The slidable meter box is then retracted and the press operated to lower the upper die half into its position in the mold body and the press is operated to compress the material to the required extent. The release cylinders 39 are then withdrawn to allow the spring loaded locking pins 35 of the mold assembly to enter the co-operating holes in the edges of both the upper and lower die halves and the press is withdrawn upwardly. The mold is now locked in a closed condition with the material compressed therein and the conveyance cylinders are operated to move the mold assembly forwardly in the production path by a distance corresponding to the size of one mold.

It will be understood that the closed loaded mold assemblies will be produced one by one and will progress along the production path and then through the heating station where the infrared heaters heat the molds sufficiently to cause the compressed material therein to cure or set. From there the molds progress to the cooling station where they are sprayed with water and optionally also air and from there to the drying station where they are blown simply with air to dry them.

It is to be noted that the molds are numbered and if it is observed that any particular mold receives a defective charge or the like, it can be withdrawn and replaced with a fresh mold when it passes the loading/replacement station 14. Such replacement is simply effected by withdrawing the removable section 15 of the support rollers and manually or otherwise withdrawing the defective mold and replacing it with a fresh one.

It will be understood that the apparatus and method described above enable a large number of articles to be molded with the use of a single press in a substantially continuous manner with finished products being withdrawn at the press as described above and fresh feed material being introduced into the mold and compressed immediately thereafter.

While the apparatus described above optimizes the use of single press, it is to be noted that fully compressing the feed material in a mold in the cold condition, as described, requires an appreciable amount of energy, and the molds must be extremely robust. The consequences of this are that an appreciable amount of energy is dissipated in the molds themselves as the molds must be of heavy and strong construction. This means that the molds will also result in heat being absorbed therein and the heavy construction of the molds can result in longish heating and cooling cycles, besides necessitating robust equipment to manipulate them, and the cost of the heavier molds themselves.

It is possible to use appreciably lighter molds by varying the method and apparatus as described above to effect initial compression of the feed material in the mold, and then allowing the mold, in the unlocked condition, to pass through a heating zone. This results in the material expanding and opening the mold with the top die half simply resting on the feed material. The heating causes the mixture to become softer, more pliable and also results in expulsion of air and water therein.

Subsequent to heating, the mold is then subjected to a second pressing operation in which much less pressure in required due to the soft and more deformable nature of the heated starting material. At this stage the molds are locked in their closed condition, and the curing or setting is allowed to proceed to completion.

In the case of a thermoplastic or thermosetting resin, the remainder of the curing or setting cycle simply requires cooling of the molds. This arrangement enables much lighter construction molds to be employed thereby resulting in saving in costs of molds, energy required to heat and cool them, as well as requiring lighter handling equipment to manipulate them. It does however necessitate two presses or, alternatively, the double use of a single press.

Figure 13:
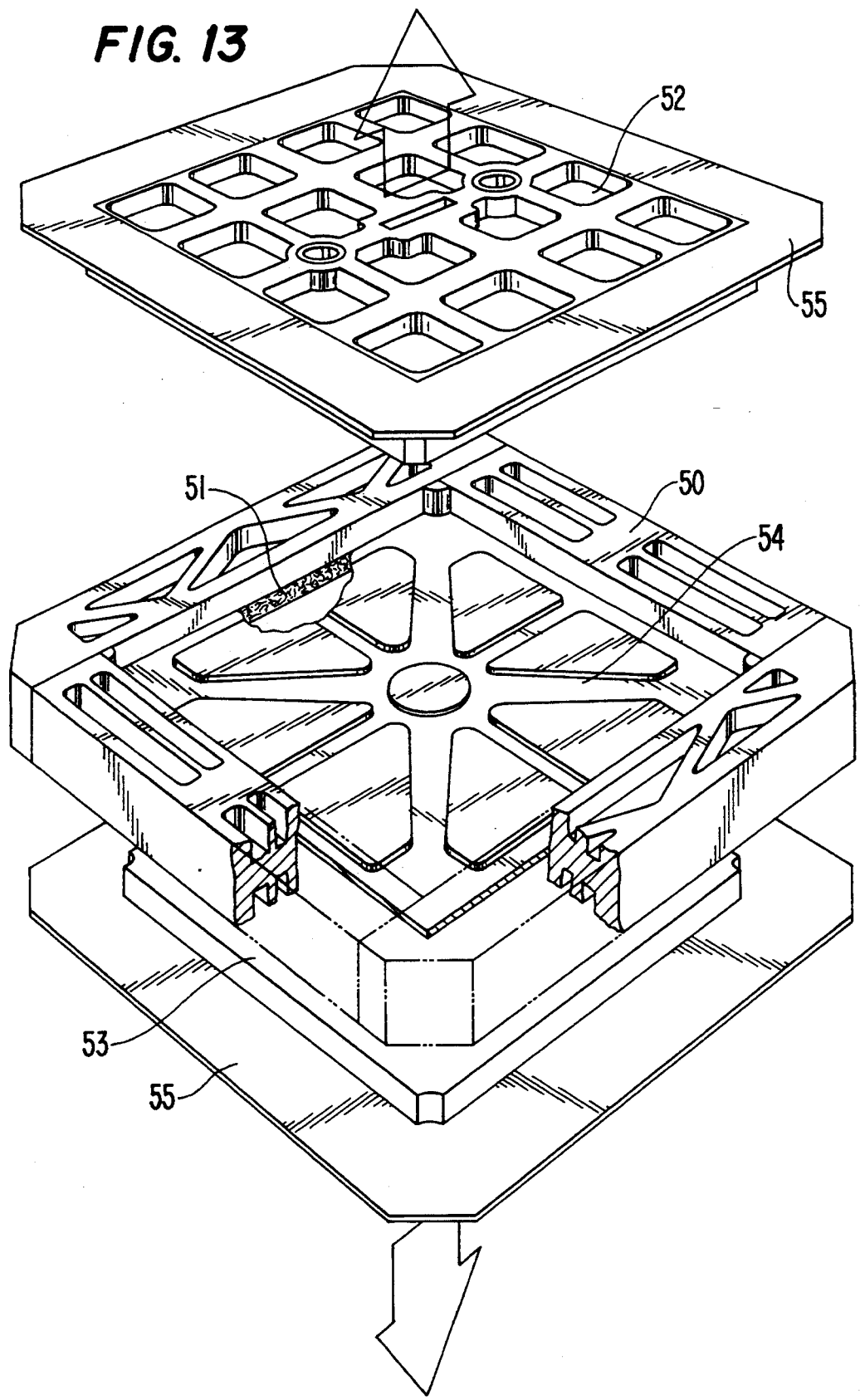

Turning now to FIG. 13 of the drawings, there is illustrated an alternative form of the invention which leads to a modified method of operation, as well.

In this case, the surrounding body 50 has a zone 51 of its inner surface between the two die halves 52 and 53. This surface zone 51 defines a periphery to the mold cavity itself which is illustrated as being occupied by a molded component 54.

This surface zone 51 is provided with formations, in this case a light, smooth, knurling, simply so that the molded article will be held within the surrounding body while the upper and lower die halves are removed. This enables the surrounding body then to be processed for the removal of the molded article which can be simply pushed out of it at a required discharge station.

In this case, another modification is that each mold half is provided with a surrounding flange 55 which determines the depths to which it moves into the surrounding body to define the mold cavity.

The method of employing this variation of the mold is somewhat different from that described above. In this case, the release of a molded article from the mold is carried out by firstly removing the one die half from the assembly, generally the top one, and thereafter separating the surrounding body from the other die half. The molded article is held captive within the peripheral body and is transferred, together with the body, to a discharge position where a plunger or other item is urged against the molded article to cause it to disengage the surrounding body and become discharged therefrom.

The surrounding body is then relocated on the lower die half and the die assembly is ready for re-use.

It will be understood that numerous variations may be made to the embodiments of the invention described above which may have consequential effects on the method whereby the mold assembly is used and, also, the press assembly in which it is used. The catch arrangements can be varied widely so long as they can effectively hold the three mold parts together and be released independently of each other so that either or both die halves can be separated from the surrounding body as and when required.

What I/We claim as new and desire to secure by Letters Patent is:

1. A mold assembly comprising a surrounding mold body into which two die halves fit to define a mold cavity between them, and catch assemblies associated with the surrounding mold body and provided between said surrounding mold body and said two die halves when said two die halves are in their cavity defining position for releasably locking each of the two die halves within the surrounding mold body in their cavity defining position relative to the surrounding mold body, wherein the surrounding mold body defines a zone of an inner surface of the periphery of the mold cavity and such surface zone has formations for holding a molded article temporarily captive within the surrounding mold body when the mold is disassembled.

2. A mold assembly as claimed in claim 1 in which the catch assemblies for locking the two die halves within the surrounding mold body are separately operable with respect to each die half.

3. A mold assembly as claimed in claim 1 further comprising means for resiliently biasing the catch assemblies towards their operative positions.

4. A mold assembly as claimed in claim 1 in which a plurality of spaced apart catch assemblies are provided, one on each of a plurality of sides of a rectangular surrounding mold body.

5. A mold assembly as claimed in claim 1 in which each catch assembly has a locking pin passing through a part of the surrounding mold body and movable inwardly from the inner periphery of the surrounding mold body to co-operate with aligned holes in the respective die half.

6. A mold assembly as claimed in claim 1 in which the said surface zone defines the periphery of the mold cavity between the two die-halves.

7. A mold assembly as claimed in claim 1 in which the said formations comprise knurling of said surface.

8. A mold assembly as claimed in claim 5 in which each of said catch assemblies comprises a rocker latch pivotably connected to said surrounding mold body, said locking pin being provided on one end of said rocker latch, an opposite end of said rocker latch being free, said locking pin and the free end being rotatable about an axis of a pivot provided therebetween.

9. A mold assembly as claimed in claim 4 in which two spaced apart catch assemblies are provided, one on each of two opposite sides of said rectangular surrounding mold body.

* * * * *